United States Patent
Yanagita et al.

(10) Patent No.: US 6,781,714 B1
(45) Date of Patent: Aug. 24, 2004

(54) COLOR IMAGE PROCESSING SYSTEM AND METHOD

(75) Inventors: Hiromi Yanagita, Tokyo (JP); Hiroyuki Iwashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/498,845

(22) Filed: Feb. 7, 2000

(30) Foreign Application Priority Data

Feb. 12, 1999 (JP) .......................................... 11-034411

(51) Int. Cl.$^7$ .......................... G06F 15/00; G06K 1/00
(52) U.S. Cl. ........................ 358/1.9; 358/1.2; 358/529; 358/518; 358/523
(58) Field of Search .......................... 358/1.2, 1.9, 529, 358/523, 518

(56) References Cited

U.S. PATENT DOCUMENTS

| | | | | |
|---|---|---|---|---|
| 5,406,394 A | * | 4/1995 | Numakura et al. | 358/518 |
| 5,434,683 A | * | 7/1995 | Sekine et al. | 358/520 |
| 5,761,573 A | * | 6/1998 | Haneda et al. | 399/66 |
| 6,031,630 A | * | 2/2000 | Blair et al. | 358/1.9 |
| 6,281,983 B1 | * | 8/2001 | Takahashi et al. | 358/1.2 |
| 6,456,404 B1 | * | 9/2002 | Furuya et al. | 358/523 |

FOREIGN PATENT DOCUMENTS

| | | | |
|---|---|---|---|
| JP | 7-123281 | | 5/1995 |
| JP | 9-22455 | | 1/1997 |
| JP | 09022455 | * | 1/1997 |
| JP | 10294880 | * | 4/1998 |
| JP | 10-294880 | | 11/1998 | ............ H04N/1/60 |

OTHER PUBLICATIONS

Japanese Office Action issued Mar. 6, 2001 in a related application with English translation of relevant portions.

* cited by examiner

*Primary Examiner*—Kimberly Williams
*Assistant Examiner*—Michael Burleson
(74) *Attorney, Agent, or Firm*—Dickstein, Shapiro, Morin & Oshinsky, LLP.

(57) ABSTRACT

The present invention provides a color image processing system for processing drawings at high speed while reproducing color tone with fidelity. The color image processing system includes a digital processor that performs a raster operation on multigradation image data and generates an output image represented by a first plurality of color components. The system also includes a processor which separates the output image data into a second plurality of color components and stores the separated data in a memory. The system includes a reverse color separator which transforms the stored image data back into image data represented by the first plurality of color components and supplies this transformed image data to the digital processor. In a preferred embodiment, the digital processor performs an under color removal/black generation conversion to separate the output image data resulting from the raster operation into cyan, magenta, yellow and black color components. The reverse color separator performs a reverse under color removal/black generation conversion to restore the stored image data to a cyan, magenta, yellow format suitable for use by the digital processor.

16 Claims, 3 Drawing Sheets

F I G. 1
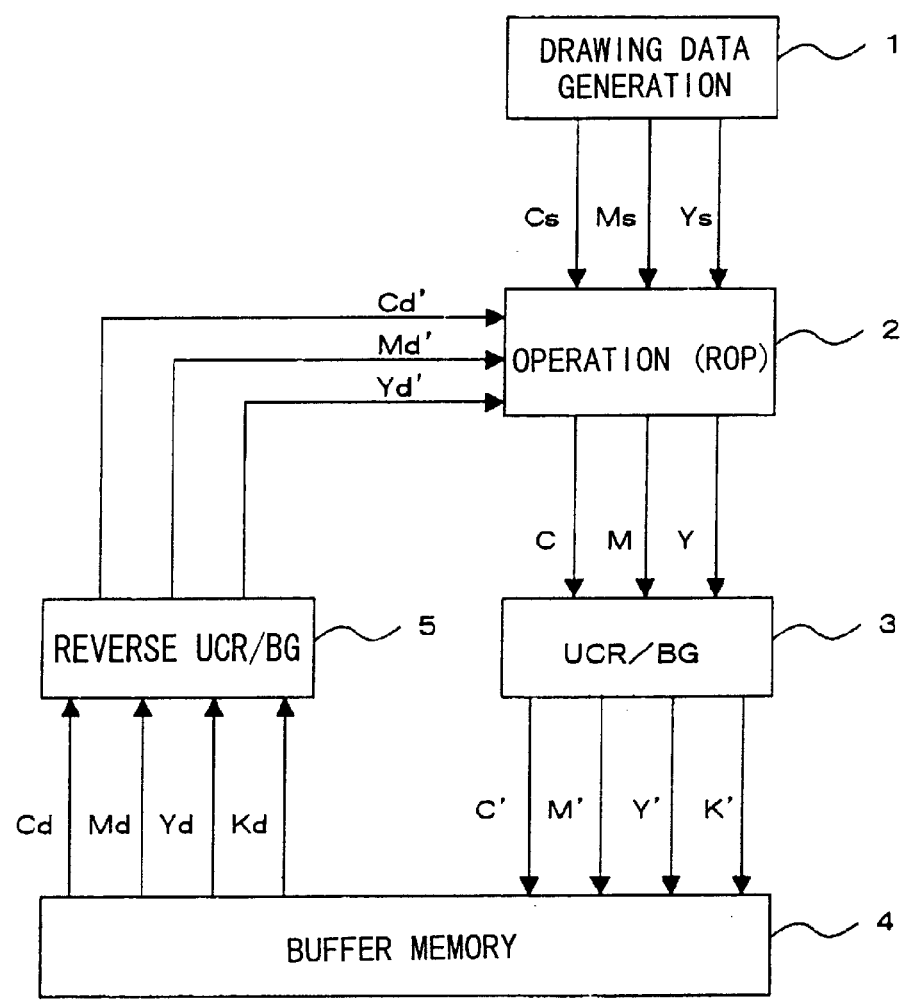

COLOR IMAGE PROCESSING SYSTEM AND METHOD

FIELD OF THE INVENTION

The present invention relates to a color image processing system and in particular to a color image processing system to which halftone image data having a plurality of colors is input for processing for drawing, which is preferable for applications in such as color printing machines.

BACKGROUND OF THE INVENTION

In general, subtractive mixture of primary three colors is used for representing colors of prints. If C (cyan), M (magenta) and Y (yellow) of inks are mixed, black color would be theoretically obtained. However, in fact complete black color can not be obtained due to characteristics of inks. Accordingly, complete black color is obtained by provision of pure black ink. At this end, image data having four colors such as C, M, Y and K (black) would be required.

In order to draw multigradation image data, a processing method is conducted comprising, drawing the image data using primary three colors of subtracting mixture, thereafter reading the drawn image data of primary three colors for generating a black form, and reducing the gradation of C, M and Y forms depending upon the gradation of the generated K form.

However, since in accordance with the prior art method, determination on drawn and undrawn pixels could not be conducted if the pixels of all C, M and Y prints are read. The above-mentioned processing should be conducted for all pixels. There is a problem that an enormously extended period of time is taken for processing.

Japanese Patent Kokai Publication No. JP-A-90-294880 (Application No. Hei 9-116119) proposes a color images processing system which are capable of providing with high quality images which are equivalent to those provided by a system of processing of four colors. In the proposed system, image data of four CMYK colors having multigradation is generated by performing a BG/UCR (black generation/under color removal) conversion on the input multigradation image data of three RBG colors, and the generated four color image data is rasterized as binary data of three CMY colors under assumption based upon the binary average error minimization technique. The color tone of processing is not changed for any applications even in a four-color printer of the system, in which raster operation (ROP) is performed after the stage of average error minimization technique, such as printer for Windows. And thus, BG/UCR processing with multigradation data is possible. In this color image processing system, speeding up is achieved while keeping a high image quality by adopting a method of binarization of C, M and Y plates.

SUMMARY OF THE DISCLOSURE

However, problems have been encountered during intense investigations toward the present invention. Namely, there is a problem that the upper limit of possible image quality is lowered at the time of binarization.

Various UCR/BG methods have been known. Various methods can be selected depending upon its processing speed and resultant image quality.

As mentioned above, prior art color image processing system has a problem that high speed drawing at the stage of drawing processing will deteriorate the color tone of the image while reproducing of color tone with high fidelity will rapidly lower the processing speed.

The reason resides in that for reproduction of color tone at high fidelity in the prior art, a K plate (data) should be generated after an entire ROP has been completed when ROP taking into account of the under color is performed. Processing of an algorithm for generation of the K plate is applied over the entire area to be drawn.

Therefore, the present invention was made ion view of above-mentioned problem. It is an object of the present invention to provide a color image processing system which achieves speeding up with an enhanced image quality.

Other objects and aspects will become apparent in the entire disclosure.

According to an aspect of the present invention, there is provided a color image processing system comprising:

input means for inputting multigradation image data having a plurality of colors; drawing means for conducting a raster operation (ROP) of image data input from said input means into a buffer memory; and output means for separating colors of the drawn image data into a plurality of colors and for outputting them. The system is characterized in that said system comprises means for updating an output image by performing a raster operation (ROP) based on read under image and new data to be drawn when drawing processing for a same pixel position should be performed a plurality of times.

Typically, the output multigradation image data on one color of said plurality of colors is the multigradation image data representative of black color.

In the present invention, the image data of black color is generated by performing a UCR/BG conversion for the output multigradation image data of the plurality of the other colors.

In the present invention, the multigradation image data of black color is reduced to the multigradation image data of a plurality of the other colors by performing a reverse UCR/BG (under color removal/black generation) conversion when the under image is read in said plural drawing processings and a raster operation (ROP) with new image data is performed.

In the present invention, in said plural drawing processings, an UCR/GB conversion is performed for an input of the newly generated multigradation image data having a plurality of colors, and the multigradation image data of black color is extracted again from the multigradation image data of a plurality of the other colors for generating and outputting the image data in which black color element is removed from the image data of the plurality of the other colors.

BRIEF DESCRIPTION OF THE DRAWINGS

FIG. 1 is a block diagram showing the configuration of one embodiment of the present invention.

PREFERRED EMBODIMENTS OF THE INVENTION

Figure 2:
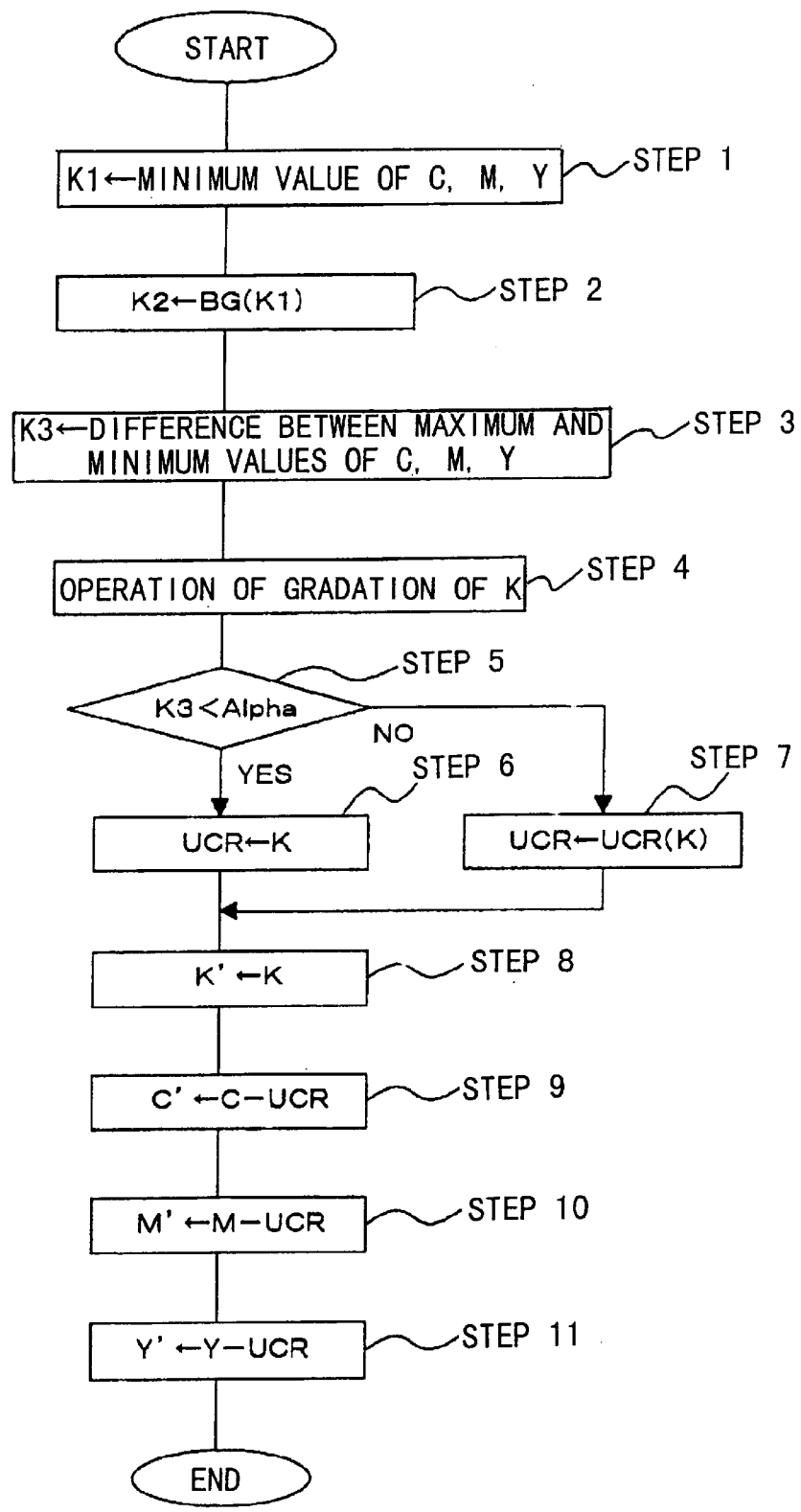
FIG. 2 is a flow chart showing an example of processing in the under color removal/black generation (UCR/BG) converting means in one embodiment of the present invention.

A mode of embodiment of the present invention will be described. In a preferred embodiment, the color image processing system of the present invention comprises UCR/BG converting means (3 in FIG. 1) for outputting as K', K (black) plate (version) which is newly generated by performing a UCR/BG conversion for said C, M, Y, which are input from the operating means and for outputting and storing in storing means (4 in FIG. 1) C, M and Y plates (versions) each having the gradation which is reduced based upon the number of gradation of the generated K plate as C', M' and Y'. The system further comprises reverse UCR/GB) converting means (5 in FIG. 1) for performing a reverse UCR/GB conversion for the under image data Cd, Md, Yd and Kd to be drawn to recover the gradation of the K plate to zero for reducing C, M and Y plates, respectively and for outputting as the destination data to the operating means Cd', Md', Yd', in which the gradation of C, M and Y is recovered to a state prior to performing the UCR/BG operation. Source data from the drawing data generating means (1 in FIG. 1) and output of the reverse UCR/BG conversion means (5 in FIG. 1) are input to the operating means (ROP) (2 in FIG. 1), which outputs C, M and Y to the UCR/BG conversion means (3 in FIG. 3).

Embodiment

An embodiment of the present invention will be described with reference to the drawings. FIG. 1 is a block diagram showing the configuration of an embodiment of the system of the present invention. The system comprises a drawing data generating means 1, operating means 2, UCR/BG converting means 3, buffer memory 4 and reverse UCR/BG converting means 5.

The drawing data generating means 1 separates the data to be drawn into the data of a color for each color material for outputting. Cs, Ms and Ys, which are output from the drawing data generating means 1 and are input to the operating means 2.

The operating means (ROP) 2 performs an operation based on the source data (data to be drawn) and the destination data (under image data) in accordance with a code specified by an application. In other words, Cs, Ms and Ys which are output from the drawing data generating means 1 are input to the operating means 2 as a source data and Cd', Md' and Yd' which are output from the reverse UCR/BG converting means 5 are input thereto as a destination data, so that the operating means 2 generates and outputs the result of operation as C, M and Y.

The UCR/BG converting means 3 performs a UCR (under color removal)/BG (black generation) conversion for the C, M and Y which are output from the operating means 2 and for outputting the newly generated K (black) plate as K', and for outputting C, M and Y plates, each having a gradation which is reduced depending on the number of gradations of the generated K plate, as C', M' and Y'. The C', M', Y' and K' are stored in the buffer memory 4.

The reverse UCR/BG converting means 5 performs a reverse UCR/BG conversion for the under image data Cd, Md, Yd and Kd to be drawn to return the gradation of the K plate to zero and for outputting the destination data to the operating means as Cd', Md', Yd', in which the gradation of C, M and Y is recovered to a state prior to performing the UCR/BG operation by reducing (returning) to the C, M and Y plates, respectively.

After the drawing processing which is specified by the application is completed by repeating the above-mentioned processing, C, M, Y and K plates, which are capable of, with high fidelity, a gradation which is specified by the application are generated on the buffer memory 4.

The converting algorithm in the UCR/BG converting means 3 should be completely reversible in the reverse UCR/BG converting means 5. Accordingly, the present invention employs the following process:

FIG. 2 is a flow chart showing the flow of processing in the UCR/BG converting means 3.

The processing in the UCR/BG converting means 3 comprises the steps 1 through 11. An example of program which defines the specification is set forth at each step.

Step 1: Minimum values of input C, M and Y are determined.

K1=min (C, M, Y)

Step 2: A BG function is applied.

K2=BG(K1)

Step 3: Difference between the maximum and minimum of C, M and Y is determined and is preset as K3.

K3=max(C, M, Y)−min(C, M, Y)

Step 4: The gradation of K is operated.

K=CRV(K3)×K2+(1−CRV(K3))×K1

Then, determination is made whether K3 is less than Alpha at step 5. The reduction of C, M and Y is classified depending upon K3. K is preset to UCR (Step 6) or K is preset to a UCR converted value (Step 7).

If K3<Alpha then UCR=K; K is preset to UCR else UCR=UCR(K); UCR<−UCR conversion

Step 8: K'=K; gradation of K

Step 9: C is preset to gradation of C after UCR

C'=C−UCR

Step 10: M is preset to gradation of M after UCR

M'=M−UCR

Step 11: Y is preset to gradation of Y after UCR

Y'=Y−UCR

Figure 3:
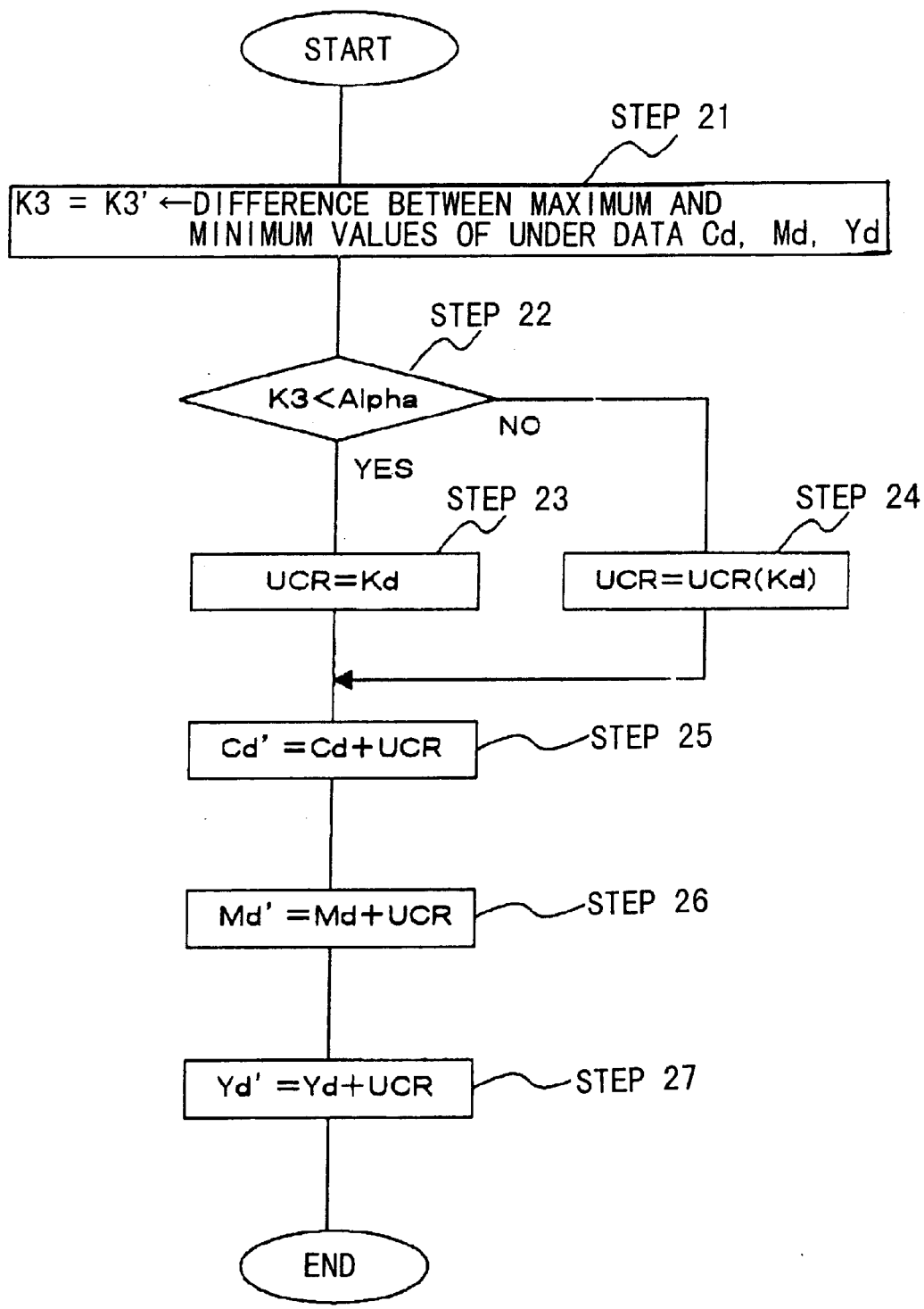
FIG. 3 is a flow chart showing an example of processing in the reverse UCR/BG converting means in one embodiment of the present invention.

FIG. 3 is a flow chart showing the flow of processing in the reverse UCR/BG converting means 5.

Step 21: Determine difference between maximum and minimum of Cd, Md and Yd output from the buffer memory 4.

K3=K3'=max(Cd, Md, Yd)−min(Cd, Md, Yd)

Stept 22: Determination is made whether K3 (differences between maximum and minimum of Cd, Md and Yd) is less than Alpha. UCR is preset as Kd (Step 23) or UCR is preset to a value UCR (Kd), i.e., to UCR-converted value of Kd (Step 24).

If K3<Alpha then UCR=Kd; Kd is preset as UCR else UCR=UCR (Kd); UCR-converted value of Kd, UCR (Kd), is preset as UCR Step 25: C is preset to the gradation of C prior to UCR Cd'=Cd+UCR Step 26: M is preset to the gradation of M prior to UCR Md'=Md+UCR Step 27: Y is preset to the gradation of Y prior to UCR Yd'=Yd+UCR The meritorious effects of the present invention are summarized as follows.

As mentioned above, the present invention provides an advantage that the speed of drawing processing can be increased and the color tone can be reproduced with high fidelity.

The reason resides in that the present invention performs the generation of K plate (version) simultaneously with the raster operation and comprises means for conducting K plate reverse color conversion to returning to the gradation of color material element prior to the generation of K plate in order to reproduce the color tone with high fidelity.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A color image processing system comprising:
   a memory;
   a digital processor which performs a raster operation on image data and generates output image data represented by a first plurality of color components;
   a processor which separates the output image data into a second plurality of color components and stores the separated data in the memory; and
   a reverse color separator which transforms the stored data back into image data represented by the first plurality of color components, and supplies the transformed data to the digital processor for raster operation in combination with other image data.

2. The color image processing system defined in claim 1, wherein one color component of said second plurality of colors comprises black.

3. The color image processing system as defined in claim 2, wherein said processor which separates the output image data performs an undercolor removal/black generation conversion.

4. The color image processing system as defined in claim 2, wherein the reverse color separator performs a reverse UCR/BG (under color removal/black generation) conversion.

5. A color image processing system as defined in claim 2, wherein said first plurality of color components does not comprise black.

6. A color image processing system comprising:
   first means for generating a K (black) plate performing a UCR/BG conversion for input C (cyan), M (magenta) and Y (yellow) image data and for generating C, M, and Y plates each having its gradation reduced based upon the number of gradations of said generated K plate;
   a memory storing said C, M, Y and K plates; and
   second means for reproducing and outputting C, M and Y plates by subjecting the C, M, Y and K plates stored in said memory to reverse UCR/BG conversion;
   wherein source data and the output of said second means are input a raster operator which outputs said C, M and Y to said first means; and
   wherein the K plate is generated simultaneously with the raster operation, and the second means outputs the C, M and Y plates prior to the generation of the K plate.

7. A color image processing system comprising:
   drawing data generating means for outputting Cs (cyan), Ms (magenta) and Ys (yellow) as source data by separating data to be drawn into a color of each of color materials;
   operating means for performing a raster operation between the source data from said drawing data generating means and destination data which is an under image data to output a result of the operation as C (cyan), M (magenta) and Y (yellow);
   UCR/BG converting means for outputting as K', a K (black) plate which is newly generated by performing a UCR/BG conversion for said C, M, Y which are input from said operating means and for outputting C, M and Y plates each having a gradation which is reduced based upon the number of gradation of said generated plate as C', M', Y' and K';
   storing means for storing said C', M', Y' and K' which are output from said UCR/BG converting means; and
   reverse UCR/BG converting means for performing a reverse UCR/BG conversion for the under image data Cd, Md, Yd and Kd to be drawn to return the gradation of the K plate to zero for reducing C, M and Y plates, respectively, and for outputting as said destination data to said operating means Cd', Md', Yd', in which the gradation of C, M and Y is recovered to a state prior to performing the UCR/BG conversion.

8. A color image processing system as defined in claim 7, wherein C, M and Y plates which are capable of reproducing with high fidelity the gradation specified by an application are generated in said operating means when predetermined drawing operation specified by the application is completed.

9. A color image processing method comprising:
   (a) inputting multigradation image data having a plurality of colors;
   (b) conducting a raster operation (ROP) of image data input by step (a);
   (c) separating colors of the drawn image data into a plurality of color components and storing output image data in a memory; and
   (d) updating the output image by performing a raster operation (ROP) on image data corresponding to the output image data and new data to be drawn.

10. A color image processing method as defined in claim 9, wherein one color of said plurality of color components comprises black.

11. A color image processing method as defined in claim 10, wherein said output image data corresponding to black is generated by performing UCR/BG conversion.

12. A color image processing method as defined in claim 9, wherein the multigradation image data of black color is reduced to the multigradation image data of a plurality of the other colors by performing reverse UCR/BG (under color removal/black generation) conversion when said under image is acquired in said plural drawing processing and raster operation (ROP) together with new image data is performed.

13. A color image processing method as defined in claim 9, wherein in said plural drawing processings, UCR/BG conversion is performed for an input of the newly generated multigradation image data having a plurality of colors, and
   wherein the multigradation image data of black color is extracted again from the multigradation image data of the plurality of the other colors for generating and outputting the image data in which black color element is removed from the image data of the plurality of the other colors.

14. A color image processing method comprising:
   (a) storing in a memory a K (black) plate which is newly generated by performing a UCR/BG conversion for input C (cyan), M (magenta) and Y (yellow) image data and generating and storing C, M and Y plates each having its gradation which is reduced based upon the number of gradations of said generated K plate; and
   (b) reproducing and outputting C, M and Y plates by subjecting the C, M, Y and K plates of the image data stored at step (a) to a reverse UCR/BG conversion;

(c) wherein source data and the output of step (b) are subjected to a raster operation for outputting said C, M and Y; and (d) wherein a K plate is generated simultaneously with the raster operation, and processing is performed for returning the K plate to the gradation of color material elements prior to generation of the K plate.

15. A color image processing method comprising:

(a) as a drawing data generation, outputting Cs (cyan), Ms (magenta) and Ys (yellow) as source data by separating data to be drawn into a color of each of color materials;

(b) performing a raster operation between the source data from said drawing data generation and destination data which is an under image data to output a result of the operation as C (cyan), M (magenta) and Y (yellow);

(c) outputting as K', a K (black) plate which is newly generated by performing UCR/BG conversion for said C, M, Y which are input from said operating means and for outputting C, M and Y plates each having a gradation which is reduced based upon the number of gradation of said generated plate as C', M', Y' and K':

(d) storing said C', M', Y' and K' which are output from said UCR/BG conversion; and (e) performing a reverse UCR/BG conversion for the under image data Cd, Md, Yd and Kd to be drawn to return the gradation of the K plate to zero for reducing C, M and Y plates, respectively, and outputting as said destination data to said operating means Cd', Md', Yd', in which the gradation of C, M and Y is recovered to a state prior to performing the UCR/BG conversion.

16. A color image processing method as defined in claim 15, wherein C, M and Y plates, which are capable of reproducing with high fidelity the gradation specified by an application, are generated in an operating unit that performs step (b) when predetermined drawing operation specified by the application is completed.

* * * * *